United States Patent [19]

Hideshima

[11] Patent Number: 4,754,338

[45] Date of Patent: Jun. 28, 1988

[54] SIGNAL READING CIRCUIT FOR MASKED AND OVERLAPPING LINEAR IMAGE SENSORS

[75] Inventor: Takahiro Hideshima, Kanagawa, Japan

[73] Assignee: Fuji Photo Film Co., Ltd., Kanagawa, Japan

[21] Appl. No.: 934,578

[22] Filed: Nov. 24, 1986

[30] Foreign Application Priority Data

Nov. 22, 1985 [JP] Japan .................................. 60-262974

[51] Int. Cl.$^4$ ............................................... H04N 1/10
[52] U.S. Cl. .................................... 358/293; 358/294; 358/213.16; 358/213.28; 250/578
[58] Field of Search .................. 358/293, 294, 213.28, 358/213.16; 250/578

[56] References Cited

U.S. PATENT DOCUMENTS

| | | | |
|---|---|---|---|
| 4,370,641 | 1/1983 | Kartor et al. | 340/146.3 |
| 4,536,801 | 8/1985 | Torkelson et al. | 358/280 |
| 4,539,598 | 9/1985 | Dietrich et al. | 358/213 |
| 4,547,677 | 10/1985 | Parker | 250/578 |
| 4,590,521 | 5/1986 | Rallapalli et al. | 358/261 |
| 4,594,503 | 6/1986 | Kilger et al. | 250/203 R |
| 4,600,843 | 7/1986 | Kizu et al. | 250/578 |
| 4,609,825 | 9/1986 | Berger et al. | 250/578 |
| 4,639,608 | 1/1987 | Kuroda | 250/578 |
| 4,652,743 | 3/1987 | Harano | 250/227 |
| 4,667,099 | 5/1987 | Arai et al. | 250/235 |
| 4,677,496 | 6/1987 | Miyazawa | 358/285 |
| 4,691,114 | 9/1987 | Hasegawa et al. | 250/578 |
| 4,824,388 | 6/1985 | Abe et al. | 358/163 |

OTHER PUBLICATIONS

Catalog, "Toshiba Contact Image Sensor", printed Nov. 85 in Japan, 8 pages.

*Primary Examiner*—Robert Lev
*Attorney, Agent, or Firm*—Sughrue, Mion, Zinn, Macpeak, and Seas

[57] ABSTRACT

A reading out circuit for a series of linear image sensors having end light elements masked and being arranged in a staggered line. The data is written in parallel into a series of multi-location storage elements, beginning with the masked light element being stored in a central location. The storing is then wrapped around so that the masked value is overwritten.

6 Claims, 2 Drawing Sheets

SIGNAL READING CIRCUIT FOR MASKED AND OVERLAPPING LINEAR IMAGE SENSORS

BACKGROUND OF THE INVENTION

1. Field of the Invention

The present invention relates to a signal reading circuit for linear image sensors such as charge coupled devices, which are connected together in a line to efficiently read the document of large size as well as the document of small size.

2. Background of the Invention

The width of reading by a linear image sensor, such as a charge coupled device, is usually about 2 to 3 cm. That width of reading is too short for the linear image sensor to read a document of size B5 or A4. For example, as shown in FIG. 3, the reading width 3 of a document 2 is larger than the length of a linear image sensor 1. In order to read the document 2 by the linear image sensor 1, a reduced image of the document 2 is focused on the photoelements of the linear image sensor 1 through a lens unit 4 and then read. For that reason, there is a disadvantage that the optical path length for making the reduced image on the linear image sensor and the size of a reading apparatus are both large.

In order to eliminate the disadvantage, a plurality of linear image sensors 1A-1D, as shown in FIG. 4 are disposed in different reading positions so that the total length of the linear image sensors is equal to the reading width of the document. Since the photoresponse properties of the linear image sensors 1A-1D need to be set equal to each other, an opaque metalization mask 5 is provided on at least the first photoelement of each of the linear image sensors 1A-1D and the levels of the output signals of the opaque metalized light-intercepted portions of the sensors are made equal to each other to equalize the photoresponse properties of the sensors 1A-1D to each other. As a result, each of the linear image sensors 1A-1D sends out a normalizing signal S1, shown in FIG. 5, having a dark reference level for the linear image sensor pixel corresponding to the opaque metalization mask 5, and an effective image signal S2 for the remaining pixels. If the output signals of the linear image sensors 1A-1D are simply synthesized together, the document 2 cannot exactly be read since the masked pixels do not provide effective image signals.

For that reason, a linear image sensor unit 10 as shown by a dot and dash line in FIG. 1 has been developed. In the linear image sensor unit 10, five linear image sensors 11-15 are disposed so that their reading positions are different from each other not only in a main scanning direction but also in sub-scanning direction perpendicular to the principal linear image sensor direction, and opaque metalized portions 11M-15M of the linear image sensors 11-15 are overlapped with the rear portions of the preceding linear image sensors 11-15. The linear image sensor unit 10 sends out, as shown in FIG. 6, a signal S1 having a dark reference level corresponding to one of opaque metalization masks 11M-15M, an effective image signal S2, and a signal S3 corresponding to the overlap of the adjacent linear image sensors. It is a problem how to process the output signals of the linear image sensor unit 10.

SUMMARY OF THE INVENTION

It is an object of the present invention to provide a signal reading circuit capable of exactly and rapidly processing the output signals of an overlapped, masked linear image sensor unit.

The present invention is a signal reading circuit for linear image sensors. A linear image sensor unit includes a plurality of linear image sensors each having an opaque metalization mask on a photoelement at one end of the linear image sensor. The linear image sensors are disposed so that the reading positions of the linear image sensors are different from each other. An A/D converter unit digitizes the output signals of the linear image sensors in parallel with each other. The outputs of the A/D converter unit are stored in storage elements of a line memory, each having a storage capacity not less than the number of the effective photoelements of each linear image sensor. Data obtained by digitizing the output signals of the linear image sensors are sequentially stored from the beginning of the data in parallel with each other in the corresponding storage elements of the line memory. The storage starts with the intermediate portion of each storage element rearwards and thereafter returning from the rearmost portion of each storage element to its foremost portion. The already written data are sequentially read out of the storage elements of the line memory, starting with the foremost portion of each of the serially connected storage elements of the line memory.

DETAILED DESCRIPTION OF THE PREFERRED EMBODIMENTS

Figure 1:
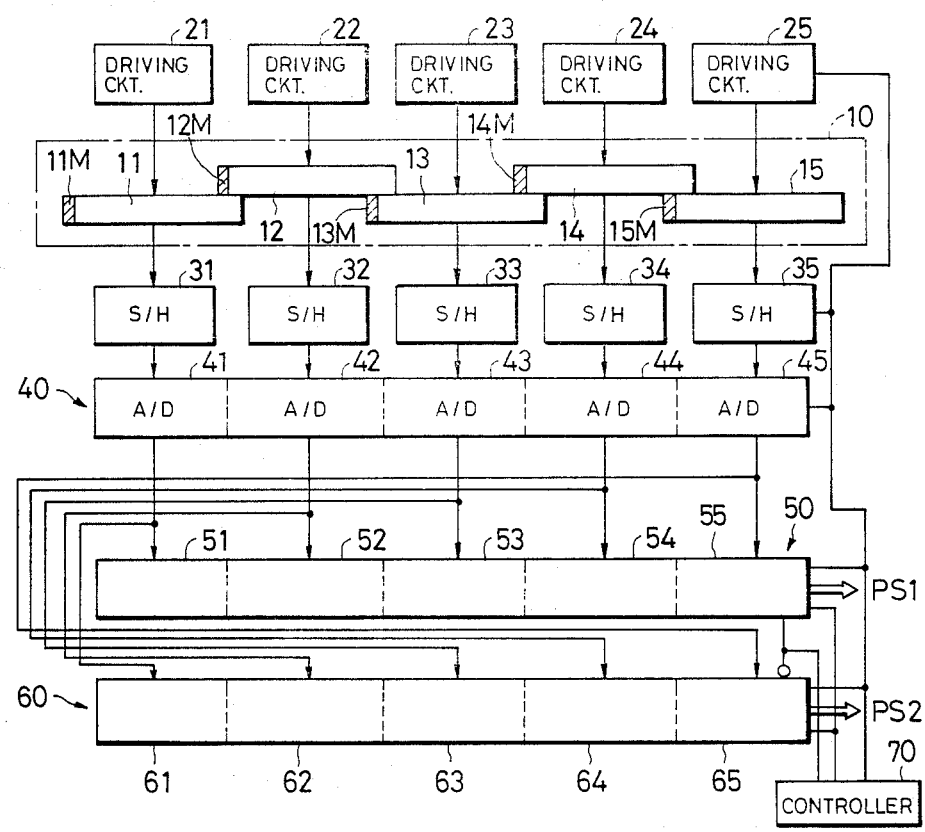
FIG. 1 shows a circuit diagram of an embodiment of the present invention.

FIG. 1 shows an embodiment of the present invention. Linear image sensors 11-15, which constitute a linear image sensor unit 10, are driven by drive circuits 21-25. The output signals of the linear image sensors 11-15 are entered into sample-and-hold circuits 31-35. The sampled and held signals are entered into the A/D converters 41-45 of an A/D converter unit 40 so that the signals are converted into digital signals. Since the reading positions of the linear image sensors 11-15 are different from each other in sub-scanning direction (transverse to the linear image sensors 11-15) as well as in a main scanning direction, the unprocessed output signals of the linear image sensors would not be identical with signals generated by reading along a single scanned line. However, in reality, the output signals are delayed in the linear image sensors 11-15 or the sample-and-hold circuits 31-35 so that the output signals are made identical with the signals generated by reading along the single scanned line.

The A/D converted output of the A/D converter unit 40 is written into one of two line memories 50 and 60 switched by a control circuit not shown in the drawings. Serial image signals P1 or P2 are read out of the other of the line memories 60 and 50. The control circuit alternately interchanges the two line memories 50 and 60 for writing and reading so that the line memory 60 serves for reading and serial image signals PS2 are read out of the line memory 60 when the data from the A/D converter unit 40 are written into the line memory 50. Similarly, the line memory 50 serves for reading and the already written data are sent as image signals PS1 out of the line memory 50 when the data from the A/D converter unit 40 are written into the line memory 60. According to the present invention, the output signals of the linear image sensors 11-15 are sampled and held in parallel with each other by the sample-and-hold circuits 31-35. The sample-held values are subjected to A/D conversion by the A/D converters 41-45. The outputs of the A/D converters are written in parallel with each other into the corresponding storage elements of the line memory 50 or 60 so as to be stored as data therein. The image signals PS1 or PS2 are sent in series with each other out of the line memory 60 or 50 to which writing has been already finished.

Figure 2A:
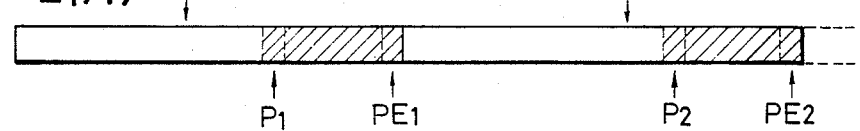
FIGS. 2(A), 2(B) and 2(C) are drawings for explaining an example of operation of the embodiment.

An image is read by the linear image sensors 11-15, starting with the positions of opaque metalization masks 11M-15M provided at the left-hand (illustrated in the drawings) ends of the linear image sensors 11-15. The digital signals obtained through the sample-and-hole circuits 31-35 and the A/D converters 41-45 are sequentially written into the storage elements 51-55 or 61-65 of the line memory 50 or 60, starting with an intermediate portion of each storage element rearwards and thereafter returning from the rearmost portion of the storage element to its foremost portion. For example, assume that the storage element 51 has a storage capacity for the number of the effective (unmasked and nonoverlapped with the following linear image sensor 12) photoelements of the linear image sensor 11 and the storage element 52 has a storage capacity for the number of the effective photoelements of the linear image sensor 12. As shown in FIG. 2(A) data obtained by digitizing the output signals of the linear image sensor 11 are written into the storage element 51 starting with a beginning address of P1 in the middle of the storage element 51, and data obtained by digitizing the output signals of the linear image sensor 12 are written into the storage element 52 starting with a beginning address of P2 in the middle of the storage element 52. For that reason, for the storage element 51, a signal having a dark reference level and corresponding to the opaque metalization mask 11M is written into the storage element 51 at the beginning address P1, and an effective image signal is thereafter written into the storage element 51.

In FIG. 1 is shown an example of the control circuitry required for the invention. A controller 70 provides the necessary control signals. Timing signals are provided on a line 71 to all the elements. A read/write select signal on a line 72 is provided to the two line memories 50 and 60 and affects them in opposite ways. In synchronism with the timing signal, address signals are provided on line 73 to the line memories 50 and 60.

Assume that each linear image sensor 11-15 has a total number $N_T$ of photoelements of which only a number $N_E$ are effective because of masking or overlap. Assume also that each of the storage elements 51-55 and 61-65 contain $N_E$ storage locations. A CCD is a serial read-out device so that $N_T$ pulses of the timing signal on line 71 will completely read out the linear image sensors 11-15 beginning with the masked element. In synchronism with these $N_T$ pulses, the address signals on the line 73 to the line memory 50 or 60 which has been write enabled begins at a value $P_1$ and continues to $PE_1 = N_E - 1$, then changes to 0 and increases to $PE_1 = N_E - 1$ by the end of the reading cycle. Although the above description applies only to storage element 51 or 61, its extension to the other storage elements should be apparent.

The line memory 50 or 60, which has been read enabled, sequentially reads out its contents in synchronism with the timing signals as the image signals PS1 or PS2.

Figure 2B:
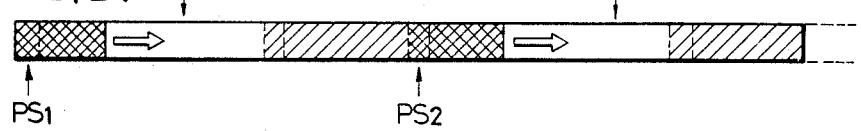
Figure 2C:
Figure 3:
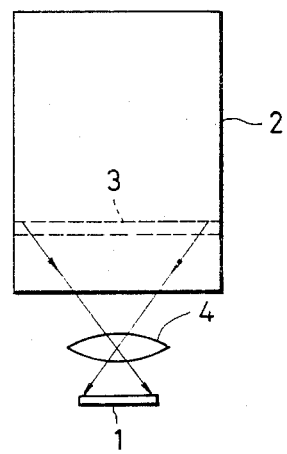
FIG. 3 shows a view of an example of reading the document by a linear image sensor.
Figure 4:
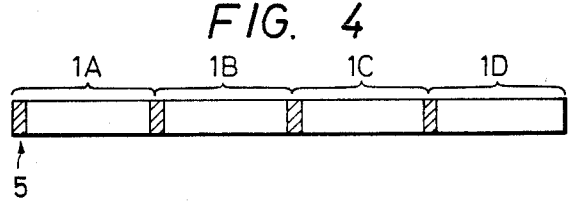
FIG. 4 shows an example of a linear image sensor unit consisting of linear image sensors connected in series with each other.
Figure 5:
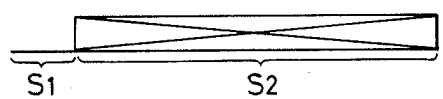
FIGS. 5 and 6 are drawings for explaining the output of data from linear image sensors.
Figure 6:
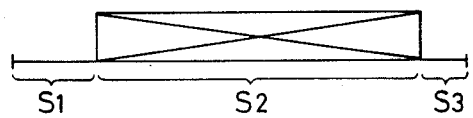

In FIGS. 2(A), 2(B) and 2(C), single-hatched portions show the writing of the signal S1 having the dark reference level, and double-hatched portions show the writing of the effective image signal S2. After the writing into the rearmost portion PE1 of the storage element 51 is completed, the writing is returned to the foremost portion PS1 of the storage element 51, as shown in FIG. 2(B). At that time, the address is adjusted so that the effective signal is written into the storage element 51 starting with the foremost portion thereof. After the effective image signal passes the beginning address P1, the effective image signal is still written so as to erase the old signal of the dark reference level, as shown in FIG. 2(C). Into each storage element having the storage capacity for the number of the effective photoelements of the linear image sensor, the effective image signal is written from the foremost portion of the storage element to its rearmost portion so that only the effective image signals are written into the line memory 50 or 60. For this reason, the unnecessary signals S1 of the dark reference level as shown in FIG. 5 are not included in the image signals PS1 or PS2 serially read out of the line memory 50 or 60.

Although five linear image sensors are connected in series with each other in the embodiment described above, the number of the linear image sensors is optional. The storage capacity of each of the storage elements of the line memory may exceed the number of the effective photoelements of the linear image sensor. In that case, reading is not performed out of the surplus storage portion of the storage element.

According to the present invention, a signal reading circuit is provided as described above, so that even if a plurality of linear image sensors are connected together in a long zigzag line, signals can be written into a memory while signals corresponding to the opaque metalization mask portions and overlapped portions of the linear image sensors are being removed. For that reason, serial image data corresponding to the document can be read out of a line memory. If line memories are alternately used for reading and writing, rapid image reading can be performed.

What is claimed is:

1. A signal reading circuit for linear image sensors, comprising:
   a linear image sensor unit including a plurality of linear image sensors at different locations transverse to a main scanning direction of said linear image sensors, each linear image sensor having a plurality of photoelements arranged along said main scanning direction, and an opaque metalization mask covering at least one photoelement at a first end of said each linear image sensor;
   a plurality of A/D converters in an A/D conversion unit digitizing in parallel outputs of said linear image sensors;
   a line memory comprising a plurality of storage elements receiving respective outputs of said A/D converters, each of said storage elements having a number of sequentially arranged storage elements of a number not less than an effective number of photoelements of a corresponding one of said linear image sensors, said effective number being no more than the number of photoelements being not covered by said opaque metalization mask;

means for sequentially writing in parallel into said storage elements output signals of said A/D converters, said sequential writing being of data derived from respective ones of said linear image sensors beginning at said first ends thereof, said sequential writing being performed into sequential ones of said storage locations beginning at an intermediate storage location of each of said storage elements, proceeding to first ends of said storage elements and continuing from a second end of said storage elements.

2. A signal reading circuit as recited in claim 1, further comprising:

means for sequentially reading out said storage elements.

3. A signal reading circuit as recited in claim 2, wherein said sequential reading means reads out said storage elements starting with said second ends.

4. A signal reading circuit as recited in claim 2, wherein there are two such line memories and further comprising means for alternating reading and writing of said two line memories.

5. A signal reading circuit as recited in claim 2, wherein said reading means reads out in one sequence said plurality of storage element.

6. A process for reading out signals from a plurality of linear image sensors, each of said linear image sensors having a plurality of photoelements arranged in a scanning direction, an opaque metalization mask covering at least one photoelement at a first end of each of said sensors, comprising the steps of:

A/D converting in parallel outputs of respective ones of said linear image sensors, said A/D converting being done sequentially from said first ends of said linear image sensors;

writing the parallel products of said A/D converting into sequential locations of a plurality of storage elements each storage element having a number of sequentially arranged storage locations, said writing being sequentially performed beginning with intermediate storage locations of said storage elements, proceeding to first ends of said storage elements and then continuing from second ends of said storage elements, said number of storage locations being no more than an effective number of photoelements of a corresponding one of said linear image sensors, said effective number being no more than the number of photoelements being not covered by said opaque metalization mask.

* * * * *